United States Patent

[11] 3,551,601

[72] Inventors William W. Sloan
Concord;
Michael J. Sturtevant, Berkeley; Kenneth R. Walters, Pleasant Hill, Calif.
[21] Appl. No. 718,111
[22] Filed Apr. 2, 1968
[45] Patented Dec. 29, 1970
[73] Assignee American Telephone and Telegraph Company
New York, N.Y.
a corporation of New York

[54] EQUIPMENT FOR AUTOMATICALLY RETRYING CUSTOMER DIALED CALLS
14 Claims, 3 Drawing Figs.

[52] U.S. Cl. 179/18
[51] Int. Cl. H04m 3/42
[50] Field of Search 179/18.211

[56] References Cited
UNITED STATES PATENTS

| | | | |
|---|---|---|---|
| 2,921,138 | 1/1960 | Baker et al. | 179/18(.211) |
| 2,819,345 | 1/1958 | Nilsson | 179/18(.211) |

*Primary Examiner*—Kathleen H. Claffy
*Assistant Examiner*—Thomas W. Brown
*Attorneys*—N. S. Ewing and James Warren Falk

ABSTRACT: Call retry equipment is disclosed in a communication switching office for automatically retrying calls which are not completed when first attempted. The equipment is connectable to a calling station over a link path of a switching network and it stores the dialed address which is utilized by the common control circuits to process subsequent call retries. During the time that the calling party is connected to the retry equipment, various tone signals are returned to the caller to indicate both the actual retrying of a call and a pause timing interval between successive retries.

INVENTORS: W. W. SLOAN
M. J. STURTEVANT
K. R. WALTERS
BY Frederick W. Padden
ATTORNEY

PATENTED DEC 29 1970 3,551,601

EQUIPMENT FOR AUTOMATICALLY RETRYING CUSTOMER DIALED CALLS

BACKGROUND OF THE INVENTION

This invention relates to switching systems and in particular to equipment for automatically retrying calls that are not successfully completed when first attempted.

Many calls cannot be successfully completed when first attempted. This may be due to various factors such as an "all paths busy" condition during a peak call traffic period or at other times due to the fact that the called station is busy. As a result, a caller customarily hangs up and redials the called station number in an endeavor to complete the call.

The undesirable consequences of repeatedly dialing the same number without success are twofold. To the caller it means undesired delay, repeated manual effort in retrying the call, and, in some cases, abandonment of the desired call after numerous unsuccessful attempts. To the telephone company it means an increased traffic load on its facilities and a loss in revenue because, in most cases, no revenue accrues for such use of the telephone company switching facilities until the call is actually completed.

Call retry arrangements are known in the prior art for retrying the calls. One such arrangement initiates call retries in response to the receipt of a busy tone which is t returned to the caller for indicating that the call cannot be completed. These arrangements are commonly furnished on a per station basis and require the provision of individual terminal equipment which is complex, expensive and, oftentimes, a bulky addition to the existing telephone station facilities. Moreover, since such equipment is customarily activated by busy tone, it requires additional common control circuit and switching network operations for establishing a busy tone connection which results in further delay before retrying the call.

In other prior call retry arrangements the call retry equipment is located at a centralized point and is available on a shared basis for connection to every station. These arrangements are recognized as an improvement over the per station arrangements, but they are not fully automatic. This obtains because, after an unsuccessful completion of a call, the caller in order to implement a call retry, is required to transmit to the centralized equipment numerous instructions including the called party number. In addition to the manual tasks and delay interposed by such semiautomatic operation, these arrangements do not include circuitry for automatically indicating to the caller that the call is actually being retried.

It is therefore apparent that a need exists for improved call retry facilities, which advantageously utilize fully automatic equipment that is shared by a plurality of stations and is operative without special instructions from a caller for retrying calls. A further need exists to furnish apparatus in such equipment which is automatically responsive, upon a failure to establish a desired call, for automatically storing the called number and then for automatically retransmitting it to the switching system for call retries. In addition to the foregoing, there is a need that such equipment automatically return to the caller an indication that the call is being served on a retry basis.

SUMMARY OF THE INVENTION

In accordance with the principles of this invention, equipment is illustratively provided in a central office and is shared by a plurality of stations for automatically retrying calls without special instructions from the caller following an unsuccessful completion of a desired call. Advantageously, this equipment eliminates the need for busy tone connections and, instead, operates automatically for establishing call retry connections at periodic intervals.

During the serving of a call by a system illustrative of our invention, a determination is made that it cannot be successfully completed whenever, for example, the trunking facilities are unavailable or the called station is busy. This determination is made by the common control circuits and, as a result, the calling party station automatically is directly connected to the retry equipment. At the time the connection is established, the common control circuits forward the called station address code to the latter equipment for storage. The call is thereafter periodically retried in accordance with the stored address code. The retired call is successfully completed when the called station line is no longer busy. During the time that a calling party is connected to our retry equipment, various tone signals are returned to him to indicate both the actual retrying of a call and a timing interval between successive call retries. Our retry equipment includes timing apparatus which times the intervals between successive retries and also times for a longer interval to cease call retries after a predetermined number of attempts.

It is noted that our invention is particularly suited to a crossbar type of switching system although not necessarily so limited. The retry equipment includes apparatus which is responsive to supervisory signals from the caller for maintaining a link connection through the switching network between the caller and the equipment. This connection is held until the called station is available and the desired connection is established.

Advantageously, in systems employing our invention the calling and called stations may be TWX-type data stations and the transmitted messages may be quite short in duration. In accordance with an aspect of our invention the retries to establish the connection can be made without unnecessarily burdening the common control equipment. Further in systems in which our invention may be incorporated the number of originating and incoming registers may be kept small as they are not tied up during the retry operations.

Further, since the calling and called stations may be equipments without human intervention, the link paths or connections through the switching network must not be tied up indefinitely by constant retry attempts. In systems including our invention both data and telephone stations may be incorporated and connected to line terminals on the switching network. The telephone stations, due to the various retry supervisory signals provided in accordance with our invention, would be aware of the number of retry attempts made. However, all stations, including data stations, are automatically disconnected after a predetermined number of retry attempts.

BRIEF DESCRIPTION OF THE DRAWING

The foregoing and other structural aspects and advantages of this invention will be more clearly understood from a reading of the following description of an illustrative embodiment with reference to the drawing in which:

FIG. 3, are a schematic representation of one illustrative embodiment of a retry register circuit together with pertinent parts of the office common control and register circuits of the embodiment of FIG. 1.

Figure 1:
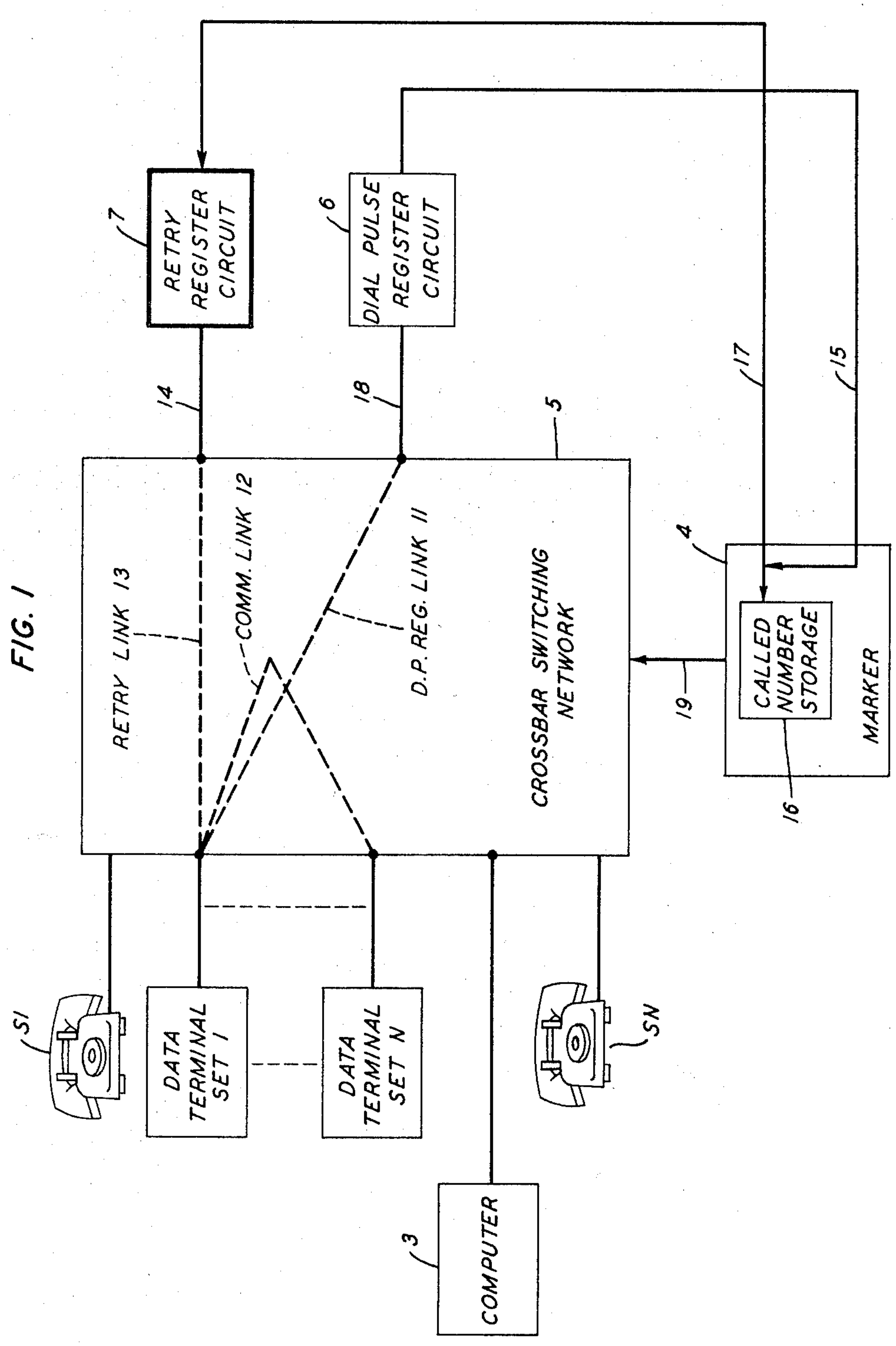
FIG. 1 is a block diagram representation of a communication switching office illustrative of one embodiment of our invention.

In the drawing, relays are shown in detached form, i.e., the operative relay winding and its contacts are separated to facilitate the disclosure of our invention. Each relay winding designation consists of a number followed by a functional designation with the number indicating the figure on which the winding is shown. Contacts of a relay are designated the same as the operative winding and, in addition, include a suffix numeral to identify the particular contact.

As shown in the drawing, the call retry equipment comprises a retry register circuit 7, disclosed in a heavy lined block of FIG. 1, which may be advantageously incorporated in an automatic telephone system wherein common control circuits are utilized to control the establishment of calls through a switching network. One such system entitled Telephone System Switching Control is disclosed in H. H. Abbott et al.

U.S. Pat. No. 2,949,506 of Aug. 16, 1960. Our illustrative equipment is disclosed herein in a system of the type disclosed in the Abbott et al. patent. Only those aspects of the other equipment units which are needed for a complete understanding of our invention are described herein in detail. Reference may be made to the aforementioned patent for a more complete understanding of the construction and operation of such other equipment.

It is noted that the switching network 5 of our illustrative equipment comprises so-called 6-point crossbar switches which are similar to those of Abbott et al. Abbott et al. however, splits the switch so that three wires are extended between the calling and called stations via the operated crosspoints. Inasmuch as it is desirous in our illustrative embodiment to extend five wires when the crosspoints are closed, the switches of our illustrative embodiment are fully wired, and the splitting control circuitry is eliminated. The hold magnet and select magnet operating circuitry remains unchanged and for the particulars of its operation Abbott et al. may be referred to.

GENERAL DESCRIPTION

Turning now to FIG. 1, the functions and interrelationships of the exemplary embodiment will now be described. As can be seen in FIG. 1 a plurality of terminal equipments are connected to terminals of a crossbar switching network 5. The network may interconnect data terminal sets 1 through N or may connect one such data terminal set to a computer 3. Alternatively, as disclosed in the Abbott et al. patent, station sets S1 and SN may be connected together. Our invention is capable of functioning with either station sets or data terminal equipment.

Let us assume that it is desired to connect data set 1 to data set N. An off-hook signal is transmitted by set 1 to the associated line circuit (not shown) and in a customary manner set 1 is connected via an originating register link path 11, indicated diagrammatically, set up in the switching network 5 to a dial pulse, or originating register circuit 6 via wire 18. Dial pulse equipment of set 1 thereupon dials the directory number of data terminal set N and thereafter the marker 4 controls the switching network 5 over cable cable 19 to establish a communication link path 12 through the switching network 5 between the data terminal sets 1 and N.

In accordance with our invention, if the marker 4 was unable to complete the connection to data terminal set N because, for example, the computer 3 was connected to set N at that instant, set 1 is instead connected via a retry link path 13 through the switching network 5 and cable 14 to the retry register circuit 7. This connection is established via the network 5 in a manner similar to connections to a busy tone trunk as further disclosed in the Abbott et al. patent.

When the original attempt was made to establish the connection between data sets 1 and N the called address code was transferred from the originating register 6 to the called number storage 16 in the marker 4 over cable 15, as is known in the art. In accordance with an aspect of our invention, at the time the retry link connection 13 is established by the marker 4 through the network 5 the called address code is transmitted over cable 17 to the retry register circuit 7 for storage therein. As further described below, this call will be retried automatically at a later time under the independent control of the retry register circuit 7, thereby relieving the calling party or equipment at set 1 of the necessity for reinitiating the call.

In our illustrative embodiment, the retry register circuit 7 is activated to retry the call by internal timing apparatus after 8 seconds have elapsed. If this t retry attempt is unsuccessful, subsequent retrys are made at 8 second intervals. After 100 seconds, if the call has not been successfully completed circuit 7 releases and the caller is disconnected. To elaborate, circuit 7 retrys a call by transmitting a "request for service" signal directly to the marker 4. Marker 4 gives preference to this request and if available for service, the retry register circuit 7 is signaled and it, in turn, transmits the stored address to the called subscriber storage 16 in the marker 4. The called station terminal is tested in a customary manner and if it is found busy, marker 4 signals circuit 7 to recycle its timing apparatus. If, on the other hand, the called station is idle and a communication link path 12 through network 5 is available, marker 4 establishes the call connection over the link path to the called terminal and signals circuit 7 to release. In releasing, retry register circuit 7 releases the link connection 13 in network 5 to the caller.

The retry register circuit 7 can be discharged, or released, from a connection to the caller at any time, or released, from a connection to the caller at any time before the end of the 100 second interval by opening the loop of the calling line. Such action is detected by circuit 7 which in turn releases the retry link path 13 of network 5 and also releases the operated relays which store the called as address in the retry register circuit itself.

The status of the call being processed by the retry register circuit 7 is continuously indicated by tone signals transmitted via the retry link path 13 of network 5 to the calling station. For example, when a call is first connected to circuit 7 an interrupted tone is returned. Later, while the call is actually being retried, a different tone interrupted at a faster rate is returned to the calling station. The interrupted tones may comprise frequencies different from the background frequencies utilized in generating customary line-busy and all-trunks-busy indications so that the different call conditions are easily discerned by the calling subscriber. When a call retry attempt is ultimately successful and the call is completed over a separate connecting connection 12, tone signals are removed upon the release of the retry link path 13 of network 5 connected to the retry register circuit 7.

If the connection is to be established between data terminal sets, such as TWX data equipment, these supervisory tones can be utilized as start and stop signals for the data terminal equipment which need not be active during the interval between successive tries, but which must be prepared to transmit if a retry is successful. Alternatively, in accordance with our invention, if the connection is to be established between telephone station sets such as S1 and SN, then these supervisory tones give the caller an audible indication of the status of his call and reassurance that his call will infact be retried.

DETAILED DESCRIPTION (FIGURES 2 AND 3)

Seizure

Figure 2:
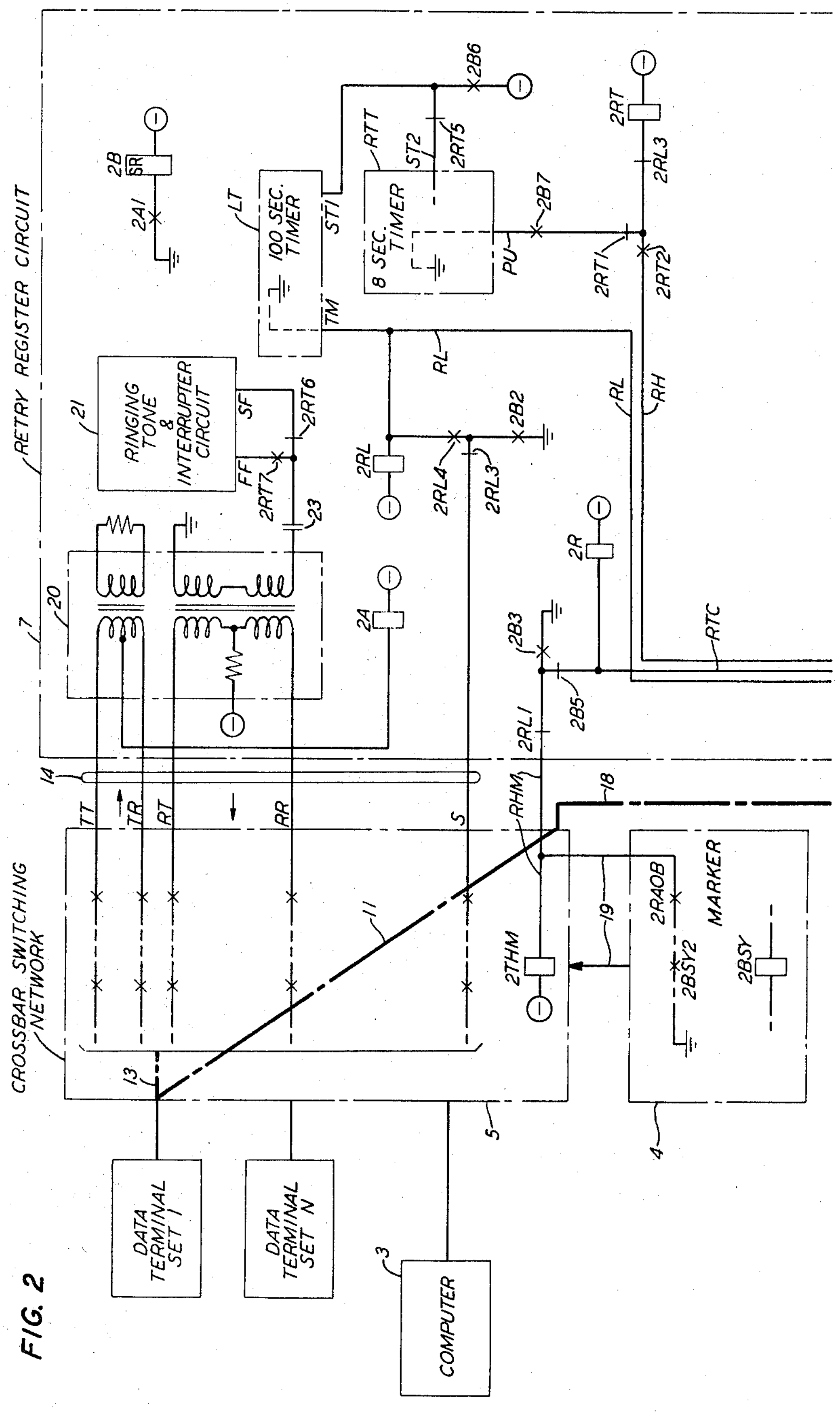
FIGS. 2 and 3, with FIG. 2 positioned above
Figure 3:
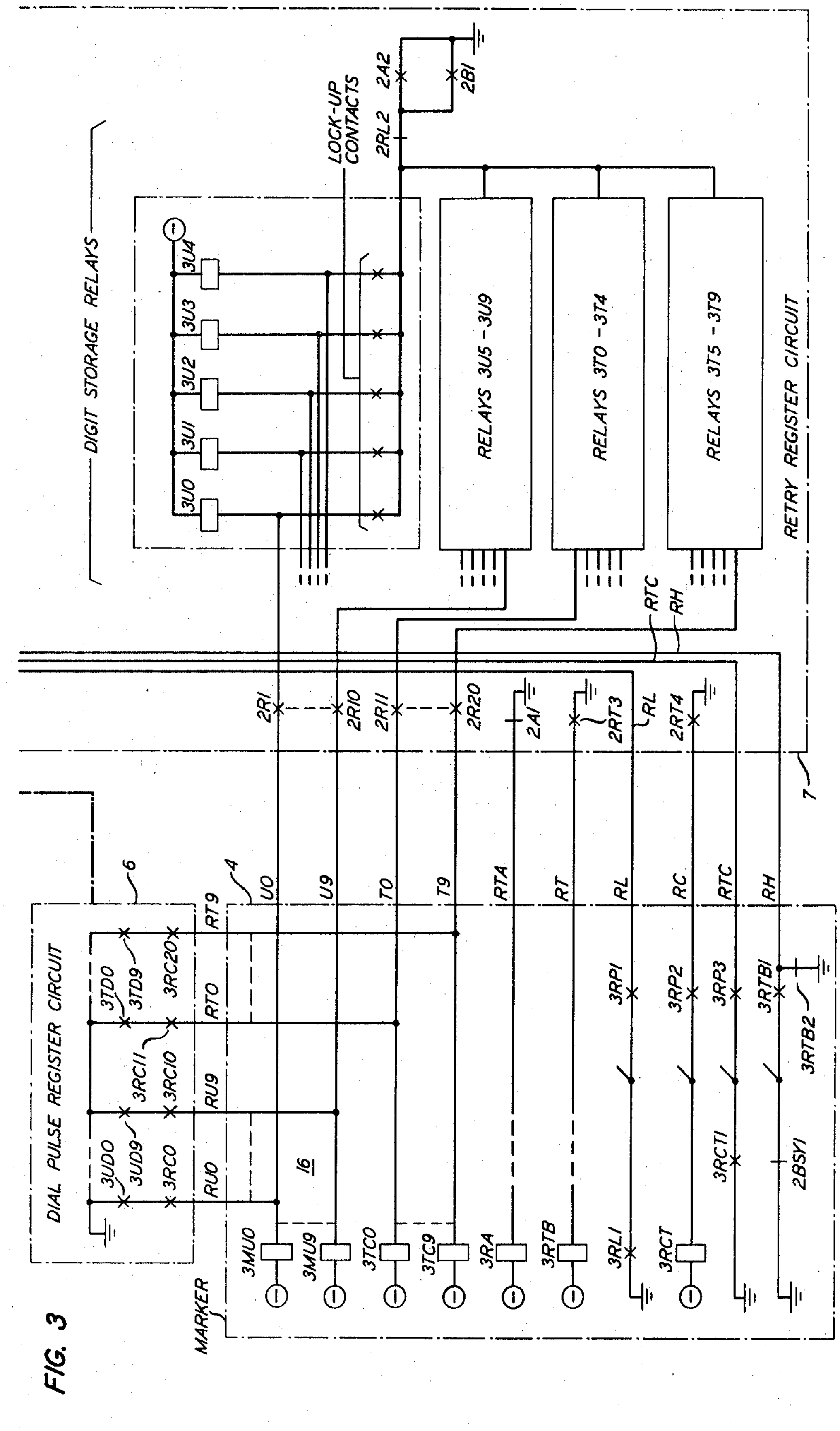

Calls which cannot be completed on the first attempt are connected by the marker 4 to the register retry circuit 7 via the retry link path 13 established by network 5 and shown in FIG. 2 as dashed lines intersected by crosses symbolically indicating switch crosspoints. Five leads designated TT, TR, RT, RR and S are included in path 13 and are interconnected with the calling station terminal by the operation of the crossbar switch. At the same time that the crosspoints are operated, the marker 4 operates relay 2R for connecting digit storage relays 3UO-3U9 and 3TO-3T9, as shown in FIG. 3, to marker 4 for storing the called station address code in the retry register circuit 7. Inasmuch as the circuitry of relays 3U5-3U9 and 3T0-3T9 is identical with that of relays 3U0-3U4, only the circuit details of the latter relays are shown.

As is known, when the attempt of the marker to establish a connection through the network 5 is thwarted because the called terminal set is busy, this is detected by operation of a busy relay 2BSY, under control of busy detection circuitry disclosed on FIG. 32 of the Abbott et al. patent and therein described beginning in column 61 under "Called Station Busy Conditions." This relay causes a number of subsequent operations, including causing the establishing of the retry link path 13 through the network 5; this is shown symbolically in FIG. 2 by the make contacts 2BSY2, but it is to be understood that the actual contacts closed in this ground path as a result of the operation of the relay 2BSY may be other contacts. The hold magnet 2THM in the switching network 5 which selects this link path 13 is operated by a ground supplied through various relay contacts of the marker 4, as indicated by the dashed line including the symbolic contacts 2BSY2 and contact of a relay 2RAOB, shown in FIG. 6 of the Abbott et al. patent, wire 19 lead RHM, and the winding of the magnet 2THM. The hold magnet operating ground also operates relay 2R in the retry register circuit 7 over a path which includes lead RHM, contact 2RL1 and contact 2B5. As pointed out above, operation of relay 2R at this time causes transfer of the called station address code from the marker 4 to the retry register circuit 7.

Turning our attention now to the digit storage relays of the retry register circuit 7, shown in FIG. 3, operated contacts 2R1 through 2R20, respectively, connect windings of relays 3U0-3U9 and 3T0-3T9 over leads U0-U9 and T0-T9 to the marker 4 storage relays 3MU0-3MU9 and 3TC0-3TC9 which comprise the called number storage 16 of FIG. 1 and which are operative under control of the units and tens digit storage relays shown in the Abbott et al. patent in FIGS. 12, 15, 16, and 17. During a call, one of relays 3MU0-3MU9 and one of the relays 3TC0-3TC9 corresponding to the called terminal, or station, address code is operated by the register circuit 6. Assuming as an example that the called address code is 90, marker tens relay 3TC9 and units relay 3MU0 are operated. In particular, relay 3MU0 is operated from a ground in register circuit 6, contacts 3UD0, contact 3RC0 and lead RU0, Tens relay 3TC9 is operated over a similar path from ground, contact 3TD9, contact 3RC20 and lead RT9. The aforementioned operating grounds are extended over leads U0 and T9 and respective contacts 2R1 and 2R20 for operating relays 3U0 and 3T9 of circuit 7.

The supervisory signal from the calling station is utilized by the retry register circuit 7 as a holding signal for maintaining operated certain of the relays of circuit 7, such as for example the aforementioned digit storage relays. Specifically, with reference to FIG. 2, this supervisory signal is a ground connected on both leads TT and TR of cable 14 by the calling station equipment which ground is coupled through upper windings of transformer 20 to operate relay 2A. Operated contact 2A1 in turn operates release control relay 2B. Referring momentarily to FIG. 3, one holding circuit is furnished by contacts 2A2 and 2B1 which are connected in parallel and provide a ground via contact 2RL2 for the digit storage relays of circuit 7. Another holding path is provided for hold magnet 2THM by contact 2B3 which connects ground via contact 2RL1 and lead RHM to the hold magnet 2THM winding. In addition, operated contact 2B5 releases relay 2R and thereby opens contacts 2R1-2R20 for disconnecting the digit storage relays of circuit 7 from those of marker 4.

The calling station equipment is signaled via lead S and the links of network 5 to indicate the detection of a supervisory signal by circuit 7 on leads TT and TR. Specifically, lead S is grounded by contact 2B2 and 2RL3.

The retry register circuit 7 is made busy for subsequent marker requests by the operation of relay 2A. Referring to FIG. 3, this is accomplished by contact 2A1 which removes ground from lead RTA for releasing marker relay 3RA.

Call Retry

After a delay of approximately 8 seconds, the register retry circuit 7 signals marker 4 to request that the call be retried. Referring now to FIG. 2, the 8 second interval is timed by timer RTT which is started when relay 2B operates. Operated contact 2B6 connects battery via contact 2RT5 to lead ST2 for starting timer RTT which, in turn, after the timing interval applies ground to lead PU. Relay 2RT is operated by the ground on lead PU via contact 2B7, contact 2RT1 and contact 2RL3. Upon operating, contact 2RT1 opens the last-mentioned operating path for relay 2RT and contact 2RT2 closes through a holding circuit via lead RH to marker 4 and therein through contact 3RTB2 to ground.

Operated relay 2RT transmits a request for service signal to marker 4 which services this request in preference to other requests from line circuits and register circuits. Specifically, contact 2RT3 in FIG. 3 grounds lead RT to marker 4 for operating marker relay 3RTB (analogous to relay R0, FIG. 11 of Abbott et al.) via marker contacts not shown but indicated by dashed lines. The operation of the latter relay, in particular at contacts 3RTB1 and 3RTB2, transfers the holding ground for relay 2RT so that ground is furnished through a marker busy relay contact 2BSY1. For a discussion of the importance of this transfer in conjunction with the operation of contact 2BSY1, refer to the following section headed "Call Terminal Busy." If marker 4 is available to serve this call retry request, marker relay contacts 3RP1, 3RP2 and 3RP3 are routinely operated as disclosed in the Abbott et al. patent; see therein the operation of relay RP shown in FIG. 12.

In accordance with an aspect of our invention, the stored address code which is recorded by the digit storage relays in the retry register circuit 7 is transmitted to marker 4 for retrying the call by the operation of relay 2R. The latter relay is operated by marker 4 relay 3RCT which is operated over a path from ground, contact 2RT4, lead RO and contact 3RP2. Operated contact 3RCT1 provides the ground for operating relay 2R via operated contacts 3RP3 and lead RTC. Upon the operation of relay 2R, contacts 2R1 through 2R20 are operated for connecting the digit storage relays of circuit 7 with the digit storage relays of marker 4. Assuming as in the earlier example that the stored called terminal address is 90, ground is connected to leads U0 and T9 for operating marker storage relays 3MU0 and 3TC9. This operating path may be traced from ground, contacts 2A2 and 2B1 in parallel connection and in series with contact 2RL2, the lockup contacts for the operated storage relays 3T9 and 3U0, and thence via operated 2R1-2R20 contacts to the respective marker storage relays.

It is to be noted that, in accordance with an aspect of our invention, the call retry is attempted automatically by the retry register circuit without regard to the busy-idle status of the called station; thus, in our invention it is not necessary first to detect that the called line or station has, in fact, become idle before initiating the call retry.

Called Terminal Idle

If the called station is available and a link 12 thereto is also available, marker 4 establishes a call connection over a separate link path 12 via network 5 and signals the retry register circuit 7 to release. Marker 4 transmits the release signal over lead RL for operating relay 2RL of circuit 7. When marker 4 has ascertained the identity of the calling station via a separate link of network 5 (see FIG. 3 of Abbott et al. the release signal is transmitted for releasing circuit 7 prior to the establishment of a connection between the calling and called stations. The release signal is generated by marker relay contact 3RL1 which grounds lead RL via operated contact 3RP1. Hold magnet 2THM is released by operated contact 2RL1 for releasing the link 13 via network 5 to the calling station. This action opens leads TT and TR and thereby the supervisory ground is removed for releasing relay 2A and, in turn, relay 2B. Contact 2RL2 opens the holding ground circuit for the digit storage relays and accordingly the respective operated ones of these relays release. In addition, contact 2RL3 opens the holding path of real relay 2RT which also releases.

To insure that the aforementioned contacts of relay 2RL remain operated long enough to release the respective circuits, relay 2RL is locked operated via contacts 2RL4 and 2B2 to ground. Since relay 2B is a slow releasing relay, relay 2RL will remain operated until all relays of the retry register circuit 7 are released.

When marker 4 releases, ground is removed from lead RTC by the release of marker relay contact 3RP3. Removal of this ground releases relays 2R and circuit 7 is restored to normal.

Called Terminal Busy

If the called terminal is still busy, or otherwise unavailable to complete the requested call connection, the marker 4 detects this condition by operation of relay 2BSY1 and then causes the retry register circuit 7 to recycle and time for another 8 seconds. Referring to FIG. 3, marker relay contact 2BY1 is operated if the called terminal is busy, thereby removing ground from lead RH which in turn causes relay 2RT to release. Relay 2RT in releasing restores the start timing signal to timer RTT by contact 2RT5 which connects battery via contact 2B6 to lead ST2. In addition, marker relays 3RTB and 3RCT are released by contacts 2RT3 and 2RT4, respectively, which remove ground from the respective leads RT and RC. The release of the marker relay 3RCT at contact 3RCT1 removes ground from lead RTC for releasing relay 2R. It will be recalled that contacts 2R1 through 2R20 connect the digit storage relays of circuit 7 with the storage relays of marker 4. Upon the release of relay 2R its contacts are opened and the address code is retained by the operated digit storage relays of retry register circuit 7.

Subsequently, when timer RTT grounds lead PU after 8 seconds, the call is retried again following substantially the circuit action described hereinbefore.

Abandoned Call

If the calling station set or data equipment goes on-hook the supervisory ground signal is removed from leads TT and TR of cable 14 releasing relay 2A and, in turn, causing the release of the retry register circuit 7. Release of relay 2A releases relay 2B. The latter at contact 2B2 removes ground from lead S and at contact 2B3 releases the hold magnet 2THM. The start signal is removed from timers LT and RTT of FIG. 2 by contact 2B6 which removes battery from leads ST1 and ST2. Contacts 2A2 and 2B1 open the holding ground circuit for the digit storage relays and accordingly the operated ones of those relays release.

The availability of the retry register circuit 7 for utilization on subsequent calls is indicated in marker 4 by operation of marker relay 3RA from ground via contact 2A1 over lead RTA. The latter relay corresponds to relay RA in FIG. 6 of the Abbott et al. patent.

Time Out

If after repeated retries the call cannot be completed within 100 seconds, the retry register circuit 7 automatically disconnects from the calling set. The 100 second interval is timed by timer LT which is activated by battery through contact 2B6 over lead ST1. At the end of 100 seconds lead TM is ground by timer LT for operating relay 2RL. Thereafter the retry register circuit 7 is released following substantially the release sequence described under the heading "Called Terminal Idle."

Signal Indications to Calling Subscriber

The retry register circuit 7, in accordance with an aspect of our invention, returns two distinctive signals to the calling set over leads RR and RT via the retry link 13 of network 5 during the time the calling equipment is connected to the retry register circuit 7. The first signal is a so-called "slow flash" indication generated by the Ringing Tone and Interrupter circuit 21 and applied on lead SF. The latter is connected by contact 2RT6, capacitor 23, and the lower windings of transformer 20 to the aforementioned leads RR and RT. The slow flash signal is changed to a fast flash signal upon the operation of relay 2RT for indicating that the call is being retried. A path may be traced for coupling this signal to leads RR and RT via lead FF from tone circuit 21, contact 2RT7, capacitor 23, and transformer 20. It is noted contact 2RT6 opens the path to the slow flash signal.

If a call retry is unsuccessful, relay 2RT is released and the slow flash signal is returned to the calling set for the next 8 seconds.

Although not disclosed in detail in the present illustrative embodiment, numerous applications of the principles of the disclosed invention are deemed apparent in the light of this teaching, such as for example furnishing adjustable timing intervals between successive call retry attempts under control of the class of service of the calling line or, alternatively, under control of apparatus for determining the density of call traffic. Upon these particular examples numerous other arrangements may also be devised by those skilled in the art without departing from the spirit and scope of this invention.

We claim:

1. Call retry equipment connectable via any one of a plurality of communication link paths of a switching office to a calling station in response to called station number digits transmitted by the station and under control of common control circuits comprising:
   means for holding a connection over one of said link paths to said calling station in response to the receipt of a supervisory signal from said calling station;
   means for storing the transmitted digits and including means subsequently activated for transmitting said stored digits to si said common control circuits; and
   means activated upon the receipt of said digits in said circuits while said one link path connection is held by said holding means for retrying the establishment of a connection over another of said link paths between said calling station and a called station regardless of the busy-idle status of said called station.

2. The invention claimed in claim 1 further comprising means for sending signals to said calling station to indicate that a call is being served on a retry basis, means for determining that a call to said called station can be completed by said common control circuits following the receipt of said digits, and means responsive to said determining means for releasing said holding means thereby releasing said connection between said equipment and said calling station.

3. The invention claimed in claim 1 further comprising means for sending a first signal via said held connection over said one link path for indicating that a call is to be subsequently retried, and means controlled by said retrying means for sending a second signal over said held connection to said calling station for indicating the retrying of said connection over said other one of said link paths between said calling and called stations.

4. The invention claimed in claim 1 wherein said equipment further comprises means for ascertaining that said call cannot be completed from said calling to said called station over said other one of said link paths, means for recycling said transmitting means which after a predetermined lapse of time automatically transmits said stored digits to said common control circuits for again retrying the establishment of said connection over said other one of said link paths, and controlling means operative after a plurality of said call retries have been unsuccessful in establishing said connection over said other one of said link paths for controlling said holding means which thereafter releases said connection over said one link path between said calling station and said retry equipment.

5. The invention claimed in claim 4 wherein said controlling means includes a timing device operative upon the establishment of said connection over said link path between said calling station and said equipment for timing a predetermined period, and means controlled by said device at the expiration of said timing period for releasing said one link path connection.

6. In combination in a communication switching office:
   a register connectable to a calling station for storing a called station number received from said calling station;
   common control means responsive to the receipt of said station number from said register for controlling the establishment of a connection between said calling and called stations and including means activated during the serving of a call for determining that a connection cannot be completed between said stations;

retry equipment including storage means automatically connectable to said common control means under control of said determining means when a call cannot be complete completed for storing a station number received from said common control means; and means activated under control of said determining means for establishing a retry connection from said calling station to said retry equipment; said retry equipment further including a. means for holding said retry connection in response to a supervisory signal from said calling station until a call connection between said calling and called stations is established; and b. means controlled by said holding means and activated periodically for operating said common control means to thereafter retry the establishment of a call connection from said calling station to said called station in accordance with said stored number in said storage means.

7. The combination of claim 6 further including indicating means for generating two distinct tones, and coupling means operative upon the establishment of said retry connection for coupling a first one of said tones to said calling station for indicating the establishment of said retry connection and further operative to couple a second one of said tones to said calling station for indicating said call retry.

8. The combination of claim 6 further including a short duration and a long duration timer both of which are activated in response to the establishment of said retry connection, said operating means being periodically activated by said short duration timer for connecting to said common control means to retry said call, and said holding means being responsive to said long duration timer after timing out for releasing said retry connection to limit the number of consecutive unsuccessful call retries.

9. The combination of claim 8 further including recycle means activated after each said call retry in the event said common control means is unsuccessful in establishing a call connection between said calling and called stations for recycling said short duration timer which after a time delay reactivates said connecting means for subsequent call retries.

10. In a crossbar switching office wherein calls which are not completed when first attempted are retried, the combination comprising:

a switching network for establishing connections;

a register connectable by said network to a calling data terminal set for storing a called data terminal set number received from said calling set;

common control means responsive to the receipt of said called data terminal set number from said register for controlling the establishment of a connection through said network between said calling and called sets;

means in said common control means for determining that said connection cannot be completed between said sets;

retry apparatus including storage means automatically connectable to said common control means under control of said determining means when a call cannot be completed for storing a called data terminal set number received from said common control means;

means activated by said determining means for controlling the establishment of another connection from said calling set to said retry apparatus through said network;

means responsive to the receipt of a supervisory signal from said calling set over said other connection for holding said retry apparatus;

timing means activated upon the establishment of said other connection between said calling set and said retry apparatus for timing a predetermined period;

connecting means responsive to said timing means for transmitting said number stored in said storage means to said common control means, said common control means thereupon retrying the establishment of a separate connection through said network between said sets and said determining means again being operative for determining that said separate connection cannot be completed between said sets;

recycle means controlled by said determining means including:

a. means for controlling said connecting means for releasing said common control means and b. means for recycling said timing means for timing another predetermined period after which said retry apparatus again tries the establishment of said separate connection between said sets; and indicating means for sending to said calling set over said other connection a first tone to indicate the establishment of said other connection and operative under control of said retry apparatus for sending to said calling set over said other connection a second tone to indicate a call retry.

11. Call retry equipment connectable via one of a plurality of communication link paths of a switching office to a calling station in response to digits transmitted by the station and under control of common control circuits comprising:

means operative upon the receipt of a supervisory signal for holding a connection over said one link path to said calling station during the receipt of said signal and for call retrying;

means for sending a first signal via said held connection over said one link path for indicating that a call is being served on a retry basis; and means controlled by said holding means for sending a second signal over said held connection to said calling station for indicating the actual retrying of the establishment of a connection over another of said link paths between said calling station and a called station.

12. In a switching system for establishing communication between calling and called stations:

register means;

switching network means for establishing a path between a calling station and said register means for storing in said register means a designation of a called station forwarded by said calling station;

a retry register circuit including retry register means;

means for storing said designation in said retry register means upon failure of said switching network means to establish a path between said calling and called stations; and common control means for controlling said switching network means to establish a path between said calling station and said retry register circuit and for enabling said retry register circuit to transmit the stored designation from said retry register means to cause said common control means periodically to attempt to establish said path between said calling and called stations.

13. In switching office equipment for automatically retrying the establishment of call connections which are not completed when first attempted, the invention comprising:

means for generating a retry signal each time the establishment of a call connection is actually retried between a calling and called station; and means cooperating with said generating means in actually conveying said signal to the calling station on every one of the actual call connection retries for indicating each said retry to said calling station.

14. The invention set forth in claim 1 further comprising means for sending a pause signal to said calling station during the time said retry signal is not conveyed and between actual call connection retries for indicating that a call is subsequently to be retried.